United States Patent
Kang et al.

(10) Patent No.: US 11,687,979 B2
(45) Date of Patent: Jun. 27, 2023

(54) DIGITAL SERVICE RESOURCE ALLOCATION AND SHARING

(71) Applicant: eBay Korea Co. Ltd., Seoul (KR)

(72) Inventors: Do Kyung Kang, Seoul (KP); Dae Sung Kim, Seoul (KP); Min Jae Kang, Seoul (KP); Sang Oh Nam, Seoul (KP); Ethan Benjamin Rubinson, San Jose, CA (US)

(73) Assignee: eBay Korea Co. Ltd., Seoul (KR)

( * ) Notice: Subject to any disclaimer, the term of this patent is extended or adjusted under 35 U.S.C. 154(b) by 0 days.

(21) Appl. No.: 16/998,894

(22) Filed: Aug. 20, 2020

(65) Prior Publication Data

US 2022/0058697 A1 Feb. 24, 2022

(51) Int. Cl.
| | |
|---|---|
| *G06Q 30/02* | (2023.01) |
| *G06Q 30/0241* | (2023.01) |
| *G06F 9/50* | (2006.01) |
| *G06F 9/451* | (2018.01) |
| *G06Q 50/00* | (2012.01) |

(52) U.S. Cl.
CPC ......... *G06Q 30/0276* (2013.01); *G06F 9/451* (2018.02); *G06F 9/5027* (2013.01); *G06Q 50/01* (2013.01)

(58) Field of Classification Search
CPC .... G06Q 30/0276; G06F 9/451; G06F 9/5027
See application file for complete search history.

(56) References Cited

U.S. PATENT DOCUMENTS

| | | | |
|---|---|---|---|
| 8,818,850 B2 | 8/2014 | Valin et al. | |
| 2006/0085254 A1* | 4/2006 | Grim, III | G06Q 30/0217 |
| | | | 705/14.19 |
| 2007/0150299 A1* | 6/2007 | Flory | H04L 63/20 |
| | | | 705/344 |
| 2008/0109306 A1 | 5/2008 | Maigret et al. | |
| 2012/0215635 A1* | 8/2012 | Ramer | G06Q 30/0273 |
| | | | 705/14.51 |
| 2014/0006129 A1* | 1/2014 | Heath | G06Q 30/0222 |
| | | | 705/14.23 |

FOREIGN PATENT DOCUMENTS

CA 3048566 A1 * 8/2020 ............. G06Q 10/10

* cited by examiner

*Primary Examiner* — Scott C Anderson
(74) *Attorney, Agent, or Firm* — FIG. 1 Patents

(57) ABSTRACT

Techniques for resource allocation with content creators are described that overcome the challenges of conventional techniques by supporting customized digital content generation and resource allocation specified by content creators of digital content. In one example, a content provider system, based on user input received via a control, specifies the portions of a resource allocation to be shared. A first portion is configured to be shared with a content creator of digital content, the digital content including service access data configured to access a digital service. A second portion is also configured to be shared with a client device that utilizes the service access data to access the digital service. Digital content is generated based on the specified portions and is transmitted. Upon access by the client device to the digital service, an indication of receipt of the first portion of the resource allocation is displayed by the content provider system.

20 Claims, 8 Drawing Sheets

DIGITAL SERVICE RESOURCE ALLOCATION AND SHARING

BACKGROUND

The Internet as a digital medium provides increased opportunities for content and service provider systems to expand their reach through corresponding digital content and digital services into almost every facet of everyday life. However, due to this proliferation, it may be difficult for users of client device to find, locate, and interact with a desired digital content or service of interest.

For example, a webpage search may return millions of results, a search of digital songs may return hundreds of examples, a search of a social media platform may return numerous user accounts and posts, and so on. Further, this challenge may be exacerbated when attempting to perform such searches across different types of digital content and services. Therefore, this results in inefficient use of network and computational resources to find, locate, and interact via this digital medium.

SUMMARY

Techniques for resource allocation with content creators are described that overcome the challenges of conventional techniques by supporting customized digital content generation and resource allocation specified by content creators of digital content. In one example, a service provider system makes a resource allocation available as part of accessing a digital service. A content provider system displays a control and an indication of the resource allocation made available. The control is configured to receive user input to specify portions of the resource allocation to be shared. A first portion is specified to be shared with a content creator of digital content, the digital content including service access data configured to access the digital service. A second portion is specified to be shared with a client device that utilizes the service access data to access the digital service. Upon receiving the user input specifying the first and second portions to be shared, the content provider system generates digital content that includes the service access data and includes a display of the second portion of the resource allocation to be shared with the client device, and transmits it. Upon access by the client device to the digital service, the content provider system displays an indication of receipt of the first portion of the resource allocation that is received in response to the accessing.

In this way, the digital content created by a content creator may be customized to control what is included in the digital content, and how the resource allocation is allocated, and as such provides a degree of control over affiliated digital content to the content creator or content provider system that is not possible using conventional techniques, while also enhancing awareness of the service provider system's digital services. Further discussion of these and other examples is included in the following sections and shown in corresponding figures.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
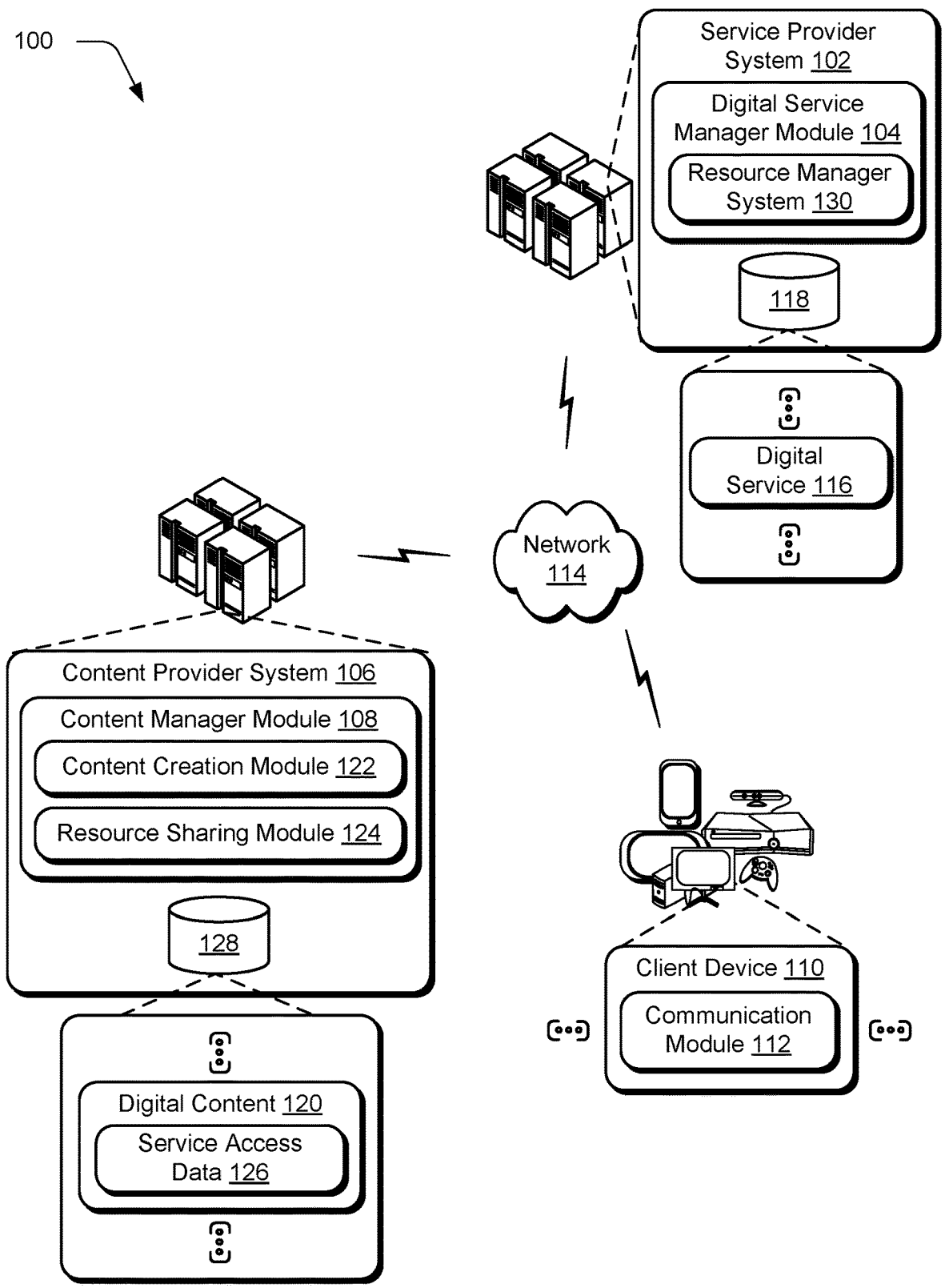
FIG. 1 is an illustration of an environment in an example implementation that is operable to employ techniques for resource allocation with content creators described herein.

Conventional techniques for finding, locating, and interacting with a desired digital content or service of interest via the Internet inefficiently uses network and computational resources due to the proliferation of the digital medium. Service provider systems are subject to these inefficiencies, despite their continued advances in computing technologies to enable their various accessible digital services to be surfaced to client devices. As a result, client devices may not surface digital services of interest, and may not be leveraged in many scenarios.

Many conventional affiliate systems are also ineffective, and merely provide a link to a specific network address of a digital service and a fixed resource allocation rate for each digital service, which limits a content creator's ability to dynamically customize the resource allocation or sharing in exchange for promoting a digital service via digital content. Such inflexibility deters content creators of varying levels of influence from collaborating with digital service providers to increase awareness and conversion of digital services, and results in missed opportunities.

Accordingly, to overcome these problems and to expand awareness of digital services that are made available by service provider systems, techniques for customizing digital content and resource allocation with content creators are leveraged. Such digital services made available include product offerings (new and used), subscription enrollment, real property, property rentals, service offerings (e.g., house cleaning, babysitting, landscaping, etc.), classified offerings, and so on. Examples of digital content include digital images, animations, audio content, multimedia content, webpages, social media posts, non-fungible tokens, and so forth.

Content creators include influencers, public figures, vloggers, bloggers, publishers, artists, organizations, independent participants, and so on. Providing digital content and digital services via content creators is advantageous because content creators increase the reach of the digital services beyond traditional mass media channels, reach online users who use ad-blockers, and often are persuasive because of their generally perceived trustworthiness, social influence, good taste, likeability, authenticity, niche expertise, and so forth.

Initially, a service provider system makes resource allocation available to a content provider system in order to increase awareness of the service provider system's accessible digital services via digital content. The resource allocation may be displayed by the content provider system via a user interface as part of accessing a digital service and at least one control. The content provider system may be configured in a variety of ways, such as to support instant messaging, social network communications (e.g., "shares" or posts), electronic messages, email, and so forth. Examples of content provider systems include messaging systems such as Apple® iMessage® and Discord®, video-sharing systems such as YouTube® and Twitch®, and social network systems including Facebook®, Instagram®, LinkedIn®, Snapchat®, Twitter®, and so forth. Broadly speaking, the at least one displayed control is configured to receive user input to specify the portions of the resource allocation to be shared.

The displayed control may be configured in a variety of ways, such as a slider control, implemented via a gesture, spoken utterance, and so forth. In one implementation, the service provider system generates service access data that is usable to access a digital service via a network, responsive to a user input received via a first control. The service provider system further generates resource allocation data responsive to a user input received via a second control to specify a resource allocation associated with the digital service. In one implementation, the user input may specify various portions of the resource allocation to be shared, and by a various number of parties. In another implementation, one portion of the resource allocation to be shared, is a first portion of the resource allocation to be shared with a content creator of digital content that includes service access data configured to access the digital service.

The service access data may also be configured in a variety of ways, such as to include a link to a network address, via which, the digital service is made available. The service access data may also include digital marketing content that is selectable to cause the client device to access the network address. The service access data is made available by the service provider system to a content provider system for inclusion in digital content created by the content provider system. In one implementation, the service access data includes a code configured to be stored as a cookie at the client device as identifying a content creator of the content provider system; the code may be further configured to cause the first portion of the resource allocation to be shared with the content creator and a second portion of the resource allocation with the client device that utilizes the service access data to access the service provider system.

The content provider system may further specify resource allocation with client devices. This may be performed in various ways, including specifying one portion (e.g., a second portion) of the resource allocation to be shared with a client device that utilizes the service access data to access the service provider system. The first portion of the resource allocation, for instance, is a base profit rate and the second portion of the resource allocation is to be shared with the client device, e.g., as a coupon.

The content provider system then generates digital content, which may be performed before or after receiving a user input via the user interface specifying the portions to be shared. The generated digital content includes service access data and includes a display of the second portion of the resource allocation to be shared with the client device. In one implementation, the generating may include receiving a user input as selecting at least one modifiable template of a plurality of modifiable templates usable to configure the service access data as part of the digital content. Example templates include landing page templates, link previews, and so forth.

The generated digital content, having service access data, is transmitted by the content provider system for dissemination to the public, and more particularly client devices used by the public to access the digital content and digital services In one implementation, the digital service is configured to receive user inputs supporting conversion of a good or service. In another implementation, the computing device may display an indication of receipt of the first portion of the resource allocation received in response to conversion of a good or service. The described techniques improve the efficiency of collaborations with content provider systems and content creators, and reduces the resources used by digital service providers, because at least some of the digital content generation and customization is standardized (e.g., the templates).

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

EXAMPLE ENVIRONMENT

FIG. 1 is an illustration of a digital medium environment 100 in an example implementation that is operable to employ techniques for customizing digital content and resource allocation with content creators described herein. The illustrated environment 100 includes a service provider system 102 with a digital service manager module 104, a content provider system 106 with a content manager module 108, and a client device 110 with a communication module 112 that are communicatively coupled, one to another, via a network 114.

The service provider system 102 provides digital services 116 such as streaming digital content, providing goods and services for purchase or reservation, obtaining a software subscription, and so forth. The content provider system 106 may be configured in a variety of ways, such as to support instant messaging, social network communications (e.g., "shares" or posts), electronic messages, email, and so forth. Example of the content provider systems 106 include messaging systems such as Apple® iMessage® and Discord®, video-sharing systems such as YouTube® and Twitch®, and social network systems including Facebook®, Instagram®, LinkedIn®, Snapchat®, Twitter®, and so forth. The content provider system 106 provides digital content 120 accessible by computing devices, such as digital images, animations, audio content, multimedia content, a webpage, a social media post, and so forth. The client device 110 is a computing device that makes digital content 120 available for interaction with via its user interface, and may be used to access or utilize digital services 116 made accessible by a service provider system 102.

Computing devices that implement these devices and systems may be configured in a variety of ways. A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is depicted and described in some instances, a computing device may be representative of a plurality of different devices, such as multiple servers utilized by a business to perform operations "over the cloud" for the service and content provider systems 102, 106 and as further described in relation to FIG. 8.

As noted above, the service provider system 102 is illustrated as including the digital service manager module 104 that is implemented at least partially in hardware of the service provider system 102 to provide the digital services 116 accessible via the network 114 to computing devices, such as the client device 110. Such digital services 116 accessible via the network 114 include product offerings (new and used), subscription enrollment, real property, property rentals, service offerings (e.g., house cleaning, babysitting, landscaping, etc.), classified offerings, and so on. The digital services 116 are stored in a storage device 118 of the service provider system 102. In particular, the digital service manager module 104 represents functionality to interact with content manager module 108 of the content provider system 106 to implement generation and customization of digital content 120 via a content creation module 122 and resource allocation with content creators via a resource sharing module 124. The content manager module 108 includes the content creation module 122 and the resource sharing module 124. Notably, the digital service manager module 104 of the service provider system 102 interacts with the content manager module 108 of the content provider system 106 to initiate the generation and customization of digital content 120, and the resource allocation with content creators, by making a resource allocation available as part of accessing a digital service 116, to be shared.

Then, the digital content 120 may be customized in a variety of different ways by the content creation module 122. Examples of customization include customizations based on a service provider system 102. This may be used, for instance, to address optimal theme colors, image sizes, fonts, and output options specified by the service provider system 102. This may also be used to select templates for the digital content 120, such as to increase a likelihood of initiation of a user interaction, such as conversion of a good or service accessible via the digital content 120.

Other customization examples are also contemplated, such as to address a temporal consideration, such as a holiday. The digital content 120, for instance, may be configured to be interactive to support user interaction prior to being used to initiate navigation to a corresponding network address, as part of initiating this navigation, and so forth. The digital content 120, for instance, may output an animation responsive to detection of a "hover" (e.g., gesture, cursor) over the digital content 120, output a digital video, include game or question and answer functionality, and so forth. In another instance, the digital content 120 includes dynamic display functionality that is usable in conjunction with selection of the digital content 120 to initiate navigation to the network address, e.g., as an animation that dynamically expands upon the digital service 116 accessible via the digital content 120, an ability to play digital media including audio and video through interaction with the digital content 120, and so forth. In this way, the content provider system 102 may customize generation of the digital content 120 as desired, further discussion of which is included in the following sections.

As noted above, the content provider system 106 is illustrated as including the content manager module 108 that is implemented at least partially in hardware of the content provider system 106 to manage the customization, creation, and resource allocation of generated digital content 120 that is accessible via the network 114 to computing devices, such as the client device 110.

In the techniques described herein, the content provider system 106 employs the content creation module 122 to generate digital content 120 including service access data 126, that then may be shared or transmitted by the content provider system 106, even in an instance in which the service provider system 102 is also configured to generate digital content 120 including service access data 126. The service access data 126 of the generated digital content 120 is usable to access a digital service 116 of the service provider system 102. Examples of service access data include a URL, a QR code, and so forth. The digital content 120 and the service access data 126 are stored in a storage device 128 of the content provider system 106.

In the techniques described herein, the content provider system 106 employs the resource sharing module 122 to specify, for generated digital content 120, the portions of the resource allocation to be shared. In one or more implementations, the first portion of the resource allocation to be shared with a content creator of digital content and a second portion of the resource allocation to be shared with a client device 110 are specified. The portion of the resource allocation may be received from a resource manager system 130 of the service provider system 102, when a determination of conversion or access to a digital service 116 or service provider system 102 is determined by the service provider system 102, content provider system 106, or the client device 110. This is appealing to content creators of a content provider system 106 because the content creators thus maintain control of the resource allocation of the digital services 116 that they introduce. Many conventional affiliate systems merely provide a link to a specific network address of a digital service and a fixed resource allocation rate for each digital service, which limits a content creator's ability to dynamically customize the profit sharing or resource allocation in exchange for promoting a digital service via digital content. This deters content creators of varying levels of influence from collaborating with service provider systems 102, and results in missed opportunities for involved parties. Moreover, such missed opportunities make it difficult for users of client devices 110 to find, locate, and interact with a desired digital content or service of interest. Therefore, this results in inefficient use of network and computational resources to find, locate, and interact via the digital medium of the Internet, or to bring awareness to digital content and services of interest. The techniques described herein overcome such challenges.

The client device 110 is configured to communicate with computing devices via the network 114 by using the communication module 112. The communication module 112 also enables the client device 110 to communicate with the content provider system 106 and the service provider system 102. Communications supported by the communication module 112 may be configured in a variety of ways. Examples of configurations of communications include instant messages, posts, emails, text messages and so on that may be communicated via the network 114. Communications that are transmitted may support different amounts, orientations and arrangements of digital content, and so forth.

In some instances, users may wish to share information about digital content 120 they have located that is accessible via the network 110. The digital content 120 may be configured in a variety of ways, such as webpages, digital images, digital audio, digital video and multimedia content, documents, and so forth that is made available via a network address (e.g., uniform resource locator) by the content manager module 108. Suppose a user of the client device 110, for instance, interacts with the content provider system 106 to access digital content 120 managed by the content manager module 108, which is stored in the storage device 128 of the content provider system 106. The user is capable of sharing information about the digital content, through the communication module 112 via the network 114 to other computing devices, including other client devices or users, content provider systems, or service provider systems.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Service Provider System Resource Allocation

Figure 2:
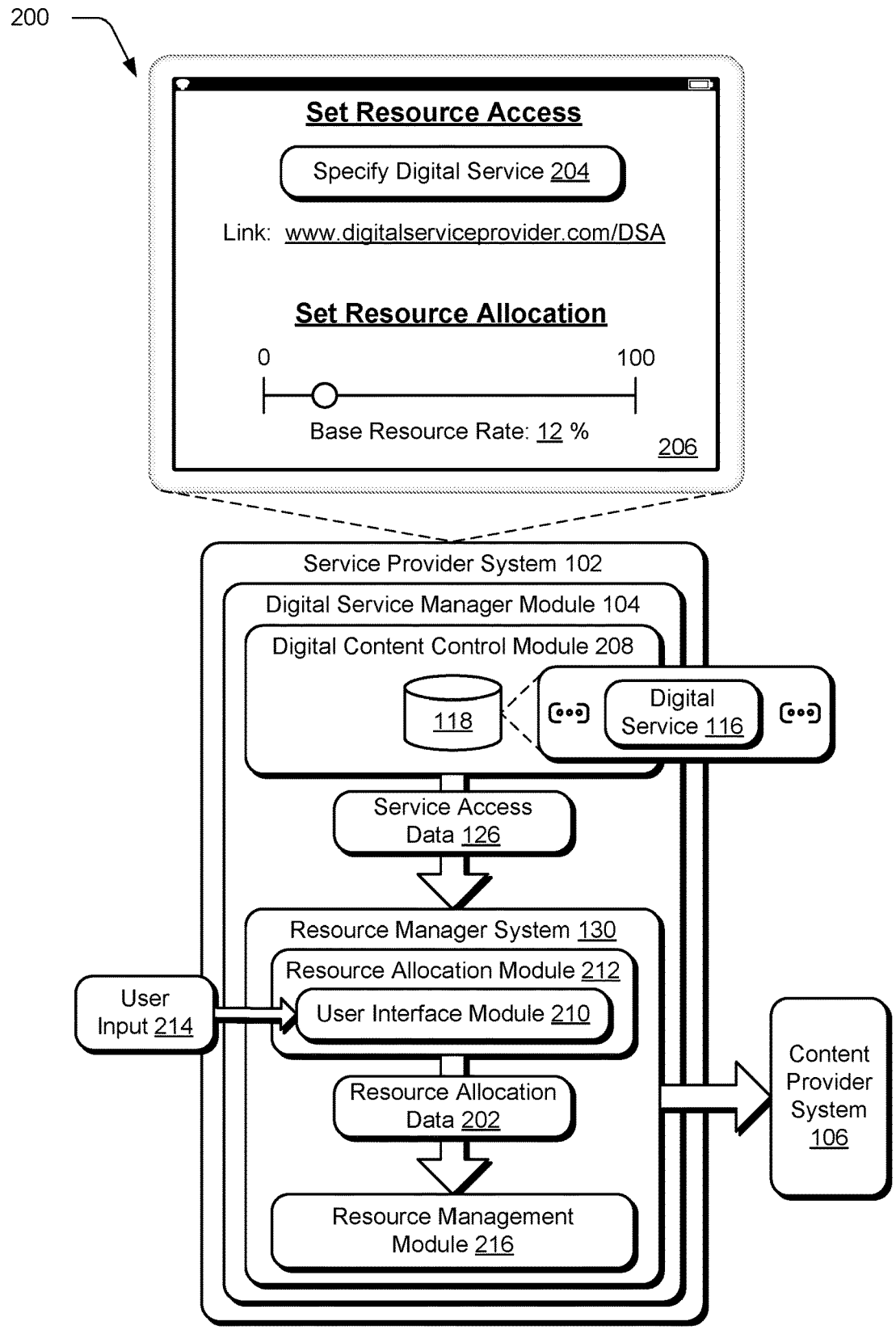
FIG. 2 depicts a system in an example implementation showing operation of a service provider system of FIG. 1 in greater detail as generating service access data and resource allocation data.
Figure 3:
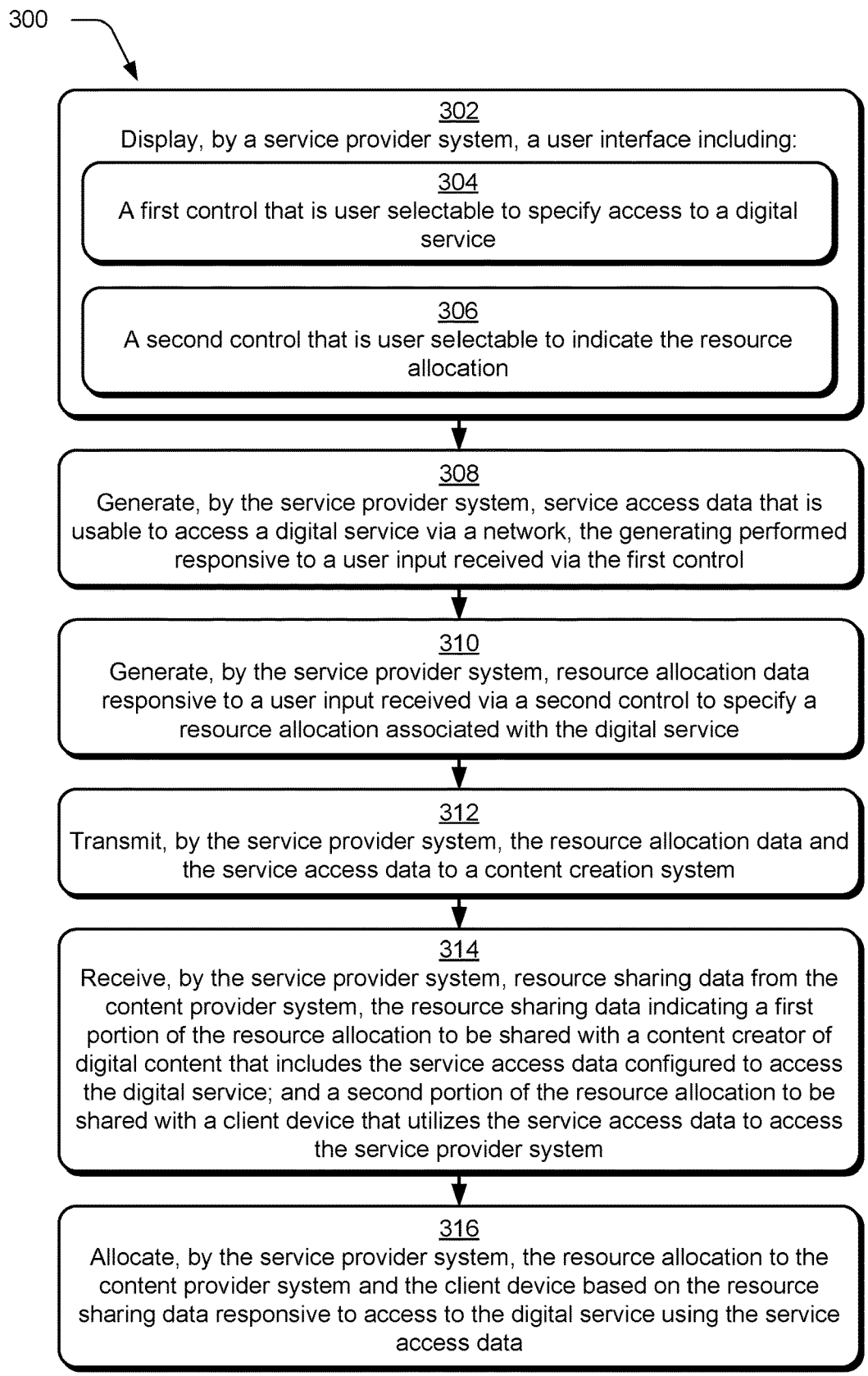
FIG. 3 is a flow diagram depicting a procedure in an example implementation in which resource allocation associated with a digital service is allocated to a content provider system based on user input received by a service provider system.

FIG. 2 depicts a system 200 in an example implementation showing operation of a service provider system 102 of FIG. 1 in greater detail as generating service access data 126 and resource allocation data 202. FIG. 3 depicts a procedure 300 in an example implementation in which resource allocation associated with a digital service is allocated to a content provider system based on user input received by a service provider system.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference is made interchangeably to FIGS. 2 and 3.

To begin in this example, a service provider system 102 displays a user interface (block 302) including a first control 204 that is user selectable to specify access to a digital service (block 304) and a second control 206 that is user selectable to indicate a resource allocation (block 306). By way of example, the service provider system 102 may correspond to an electronic commerce platform (e.g., eBay®, OpenSea®), a property rental platform (e.g., Airbnb®, VRBO®), and so forth.

Then, responsive to a user input 214 received via the first control 204 via the digital content control module 208, the service provider system 102 generates service access data 126 that is usable to access a digital service 116 via a network 114 (block 308). The service access data 126 may be configured as a link, a QR code, and so forth. In one implementation, the service access data 126 includes digital marketing content that is selectable to cause a client device to access the network address. The service access data 126 may also comprise graphics, digital media, and so on. In one or more implementations, at least one of a plurality of templates may be usable to configure the service access data as part of the digital content. In one implementation, the service access data 126 includes a code configured to be stored as a cookie at the client device as identifying a content creator of a content provider system. The service access data 126 may include a link to a network address, via which, the digital service 116 is made available. Then, responsive to a user input 214 received via a second control 206 via a user interface module 210 of a resource allocation module 212 to specify a resource allocation associated with the digital service 116, the service provider system 102 generates resource allocation data 202 (block 310).

In the illustrated example of FIG. 2, the service provider system displays, via a user interface, the ability to "Set Resource Access". The "Specify Digital Service" button, a first control 204, is user selectable vi user input 214 to specify access to a digital service 116. As illustrated, a second control 206 is user selectable to indicate resource allocation under "Set Resource Allocation". In this example scenario, the second control 206 may be dragged to set a "Base Resource Rate", however various different control configurations are possible, as are various different resource allocation settings. As illustrated, the service access data 126 in this example is a selectable link, and the resource allocation data is 12%.

In this scenario, the service provider system 102 may next transmit the resource allocation data 202 and the service access data 126 to a content provider system 106 (block 312). Then the resource management module 216 of the service provider system 102 receives resource sharing data from the content provider system 106, the resource sharing data indicating a first portion of the resource allocation to be shared with a content creator of digital content 120 that includes the service access data 126 configured to access the digital service 116, and a second portion of the resource allocation to be shared with a client device 110 that utilizes the service access data 126 to access the service provider system 102 (block 314). Based on the resource sharing data responsive to access to the digital service 116 using the service access data 126, the resource management module 216 of the service provider system 102 allocates the resource allocation to the content provider system 106 and the client device 110 via the network 114 (block 316).

Content Provider System Resource Sharing

Figure 4:
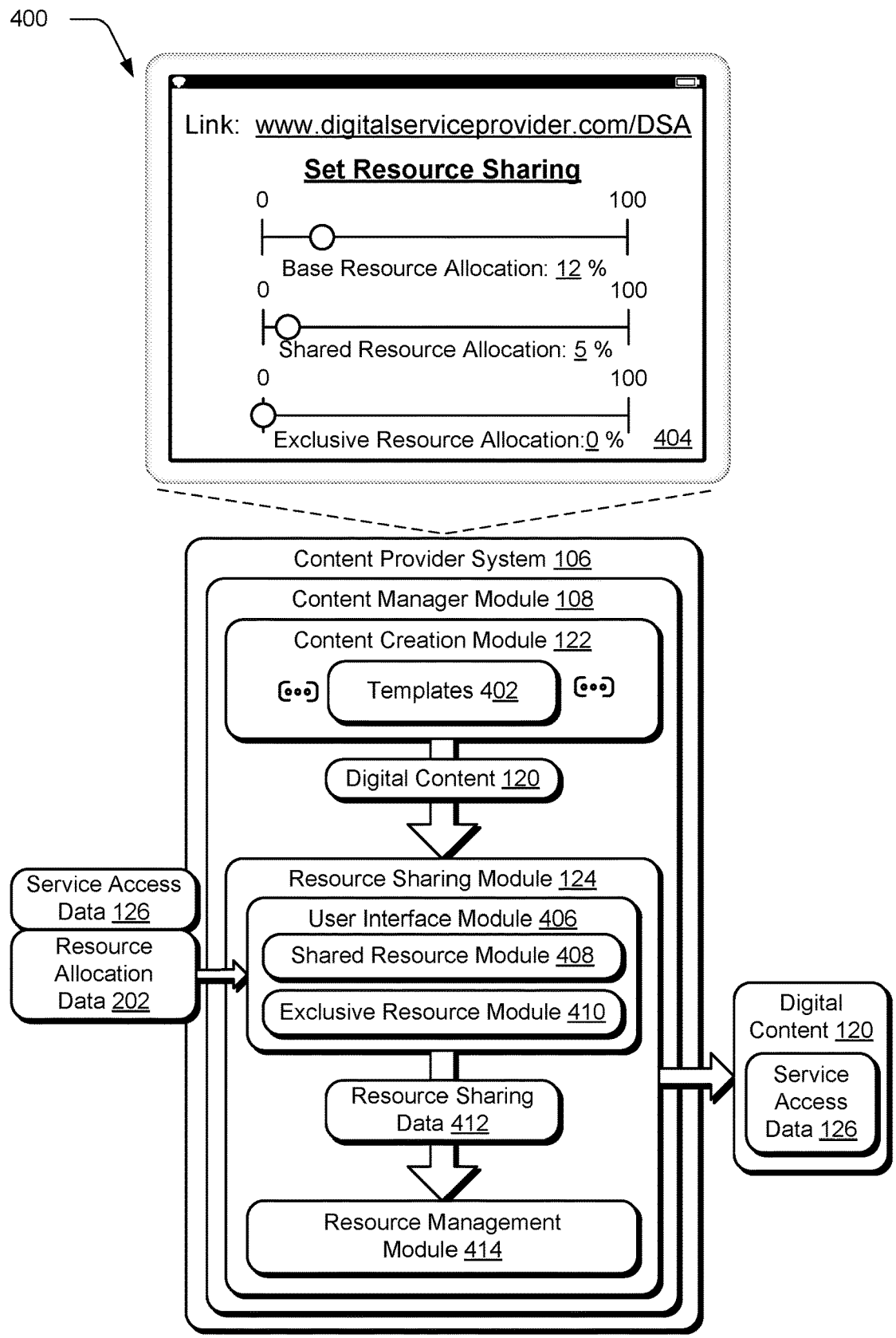
FIG. 4 depicts a system in an example implementation showing operation of a content provider system of FIG. 1 in greater detail as generating digital content including service access data.
Figure 5:
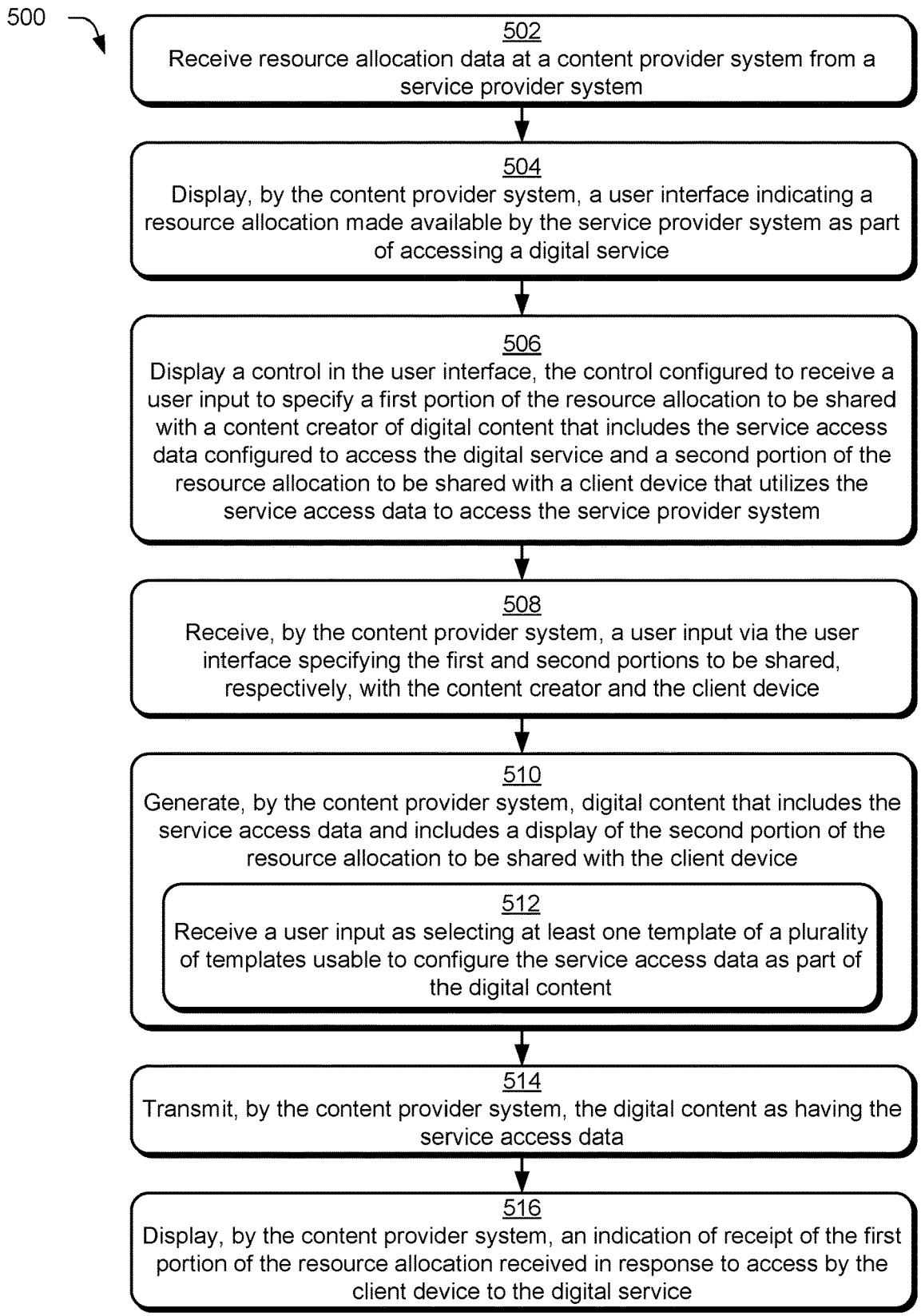
FIG. 5 is a flow diagram depicting a procedure in an example implementation in which a template is selected from a plurality of templates to configure service access data as part of generated digital content.

FIG. 4 depicts a system 400 in an example implementation showing operation of a content provider system 106 of FIG. 1 in greater detail as generating digital content 120 including service access data 126. FIG. 5 depicts a procedure 500 in an example implementation in which a template is selected from a plurality of templates to configure service access data as part of generated digital content.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 4 and 5.

To begin in this example, the content creation module 122 of the content provider system 106 is illustrated as creating digital content 120. In one or more implementations of the creation of digital content 120, the content creation module 122 may receive user input to customize the creation of the digital content 120 by selecting at least one template of a plurality of templates 402 usable to configure the digital content. These templates 402 may be modified by user input received by the content creation module 122. Such user inputs may modify information presented by the generated digital content 120. By way of example, a template 402 may be modified to change a digital image included in the digital content 120, or the configuration of the service access data 126 as part of the digital content 120 may be modified (block 512). Alternately or in addition, the modification of a template 402 may indicate additions to the information in the template 402 of the digital content 120, such as to add additional information to a description, add additional images (e.g., to show different views or features of a listed product or service), and so on.

The content creation module 122, in one or more implementations, is capable of configuring digital content 120 to take advantage of using digital content 120 as a post in a feed as part of a social network system. For example, the content creation module 122 is capable of formatting different digital content for different social network systems or platforms, such as digital content that is formatted as images for image-focused social network systems such as Instagram®, or digital content that is formatted as text for text-focused social media systems such as Twitter®. Other example capabilities include formatting for display in a generally landscape orientation, or in a portrait orientation for limited display areas, such as a message. In this way, the same digital content 120 available for the same digital service 116 may be generated differently to address the computing device (e.g., the client device) or the content provider system 106, via which, the digital content 120 is to be displayed.

Then, the resource allocation data 202 is received by a resource sharing module 124 at the content provider system 106 from a service provider system 102 (block 502). As depicted in the illustrated example of FIG. 4, the "Base Resource Allocation" of 12% is resource allocation data received by the resource sharing module 124, which is displayed by a user interface (block 504). Next, the service provider system 102 displays a control 404 in the user interface via a user interface module 406. The control is configured to receive, by the shared resource module 408, a user input to specify a first portion of the resource allocation to be shared with a content creator of digital content that includes the service access data 126 configured to access the digital service. The control is further configured to receive, by the exclusive resource module 410, a second portion of the resource allocation to be shared with a client device 110 that utilizes the service access data 126 to access the service provider system 102 (block 506). Then a user input is received by the user interface module 406 of the content provider system's resource sharing module 124, the user interface module 406 specifying the first and second portions to be shared, respectively, with the content creator and the client device 110, as resource sharing data 412 to be communicated with the resource management module 414 (block 508). As depicted in the illustrated example of FIG. 4, the first portion is specified as 5% of the "Shared Resource Allocation", and the second portion is specified as 0% of the "Exclusive Resource Allocation" by the control 404. Accordingly, in the illustrated example of FIG. 4, no resource allocation is to be shared with a client device that utilizes the service access data to access the service provider system.

As illustrated, the control 404 may be configured to specify a first portion of the resource allocation to be shared with a content creator (e.g., the "Shared Resource Allocation", an additional profit rate, and so forth), and a second portion of the resource allocation to be shared with a client device that utilizes the service access data to access the service provider system (e.g., the "Exclusive Resource Allocation", an exclusive coupon or discount rate, and so forth), however, the control 404, in one or more implementations, may be configured to specify different configurations of resource sharing or resource allocation. For example, a content creator could configure the resource allocation portions in such a manner that the entire resource allocation made available by the service provider system 102, is allocated as an exclusive discount rate for client devices that utilize the service access data 126 to access the service provider system 102.

As illustrated, the content provider system 106 generates digital content 120 that includes the service access data 126 and includes a display of the second portion of the resource allocation to be shared with the client device 110 (block 510). The digital content 120 may also be generated "offline". In an implementation, the digital content 120 may be cached in a storage device for use in subsequent requests, e.g., for a defined amount of time, based on an amount of past usage, and so forth, which is a technical advantage. The digital content 120 is transmitted by the content provider system 106, the digital content 120 as having the service access data 126 (block 514). Then, the content provider system 106 displays an indication of receipt of the first portion of the resource allocation received in response to access by the client device 110 to the digital service 116 (block 516).

Client Device Digital Service Access and Resource Sharing

Figure 6:
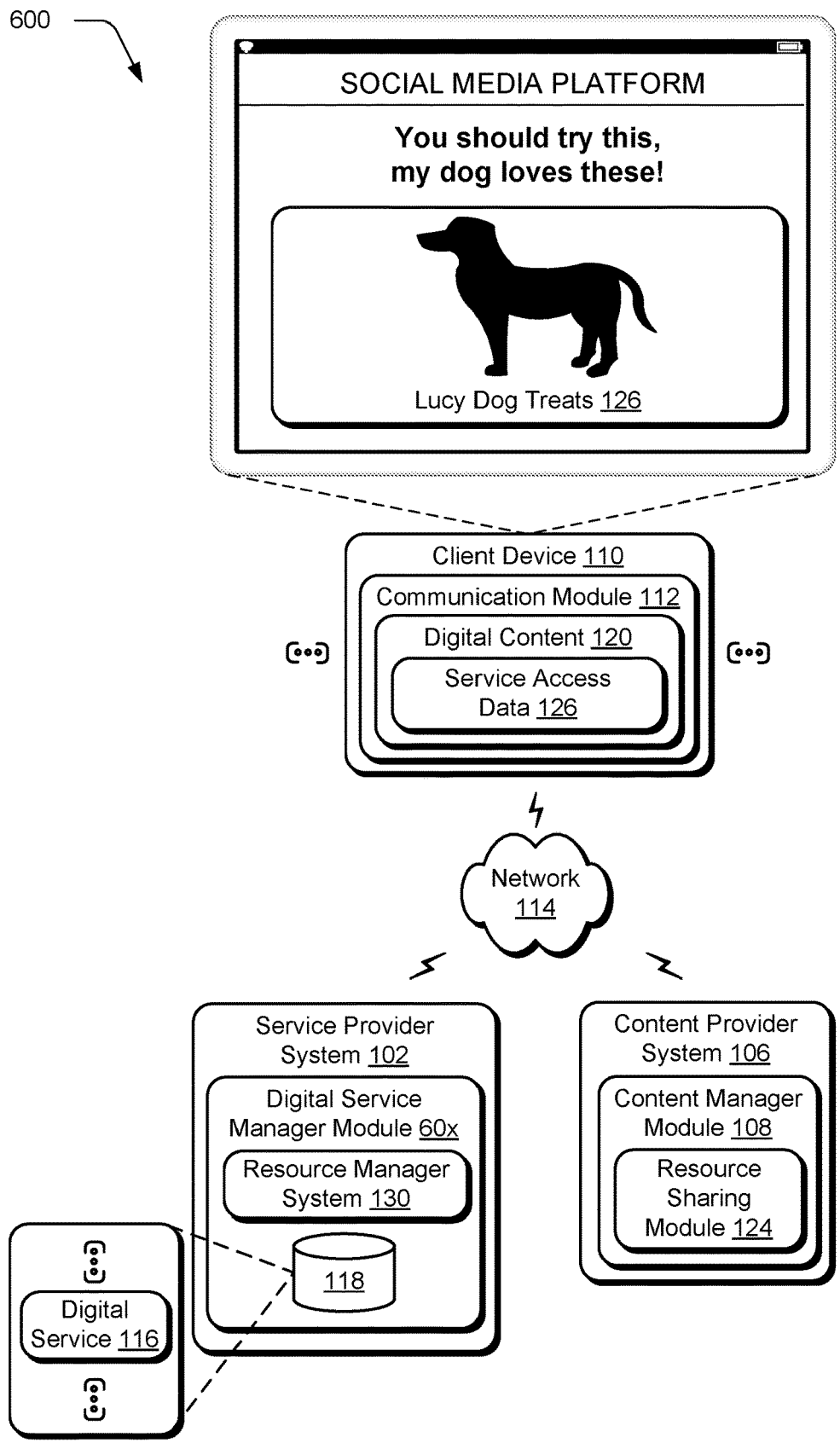
FIG. 6 depicts a system in an example implementation in which a client device receives service access data to access a digital service.
Figure 7:
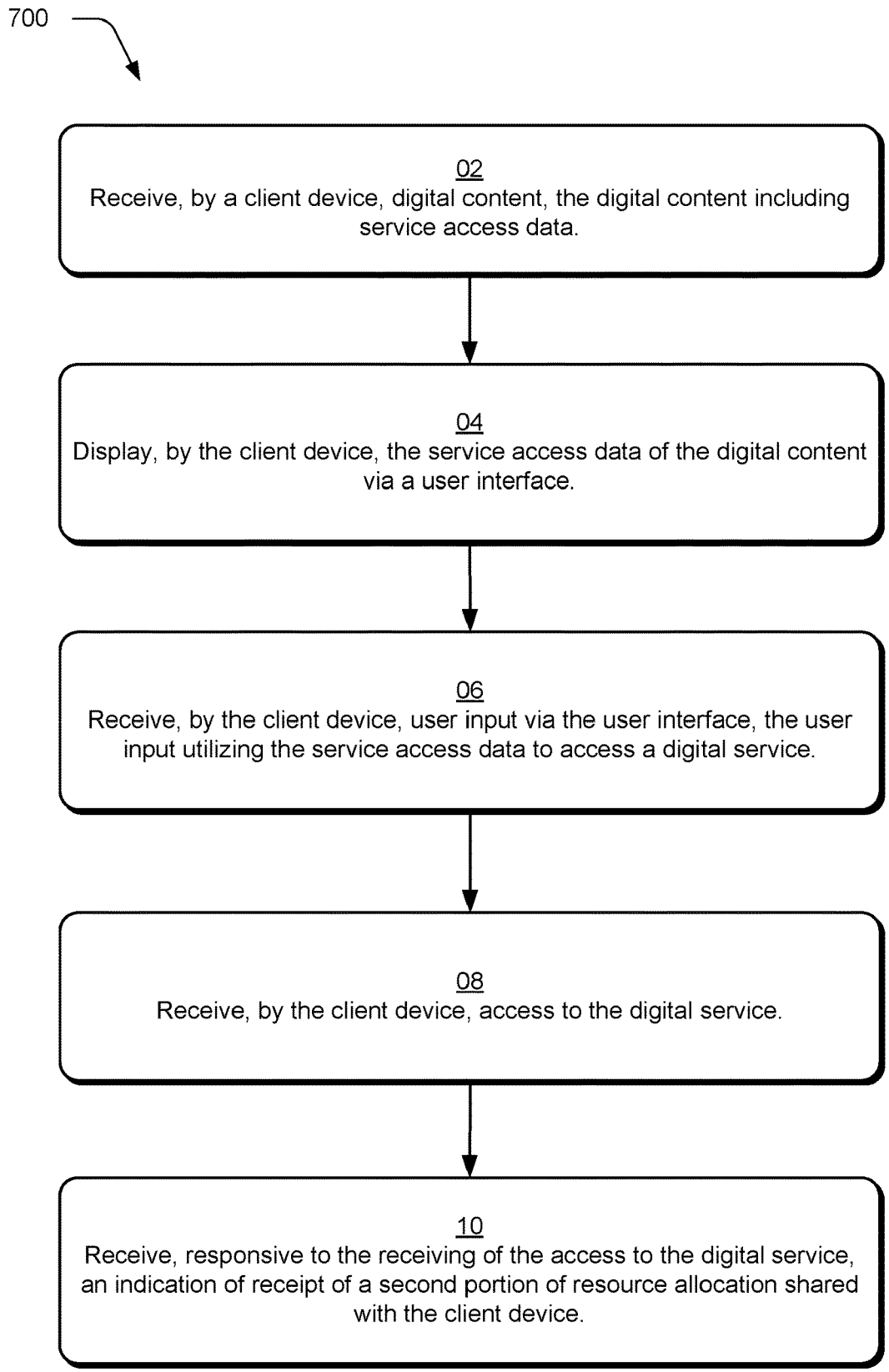
FIG. 7 is a flow diagram depicting a procedure in an example implementation in which a client device receives service access data to access a digital service and receives a portion of the resource allocation.

FIG. 6 depicts a system 600 in an example implementation in which a client device 110 receives service access data 126 to access a digital service 116. FIG. 7 depicts a procedure 700 in an example implementation in which a client device receives service access data to access a digital service and receives a portion of the resource allocation.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 6 and 7.

To begin in this example, digital content 120 including service access data 126 is received by a communication module 112 of a client device 110 (block 702). Next, the service access data 126 of the digital content 120 is displayed via a user interface of the client device 110 (block 704). This is depicted in the illustrated example of FIG. 6 as a selectable image link of a dog for "Lucy Dog Treats" that is displayed on a social media platform. Continuing with the illustrated example, user input may be received by the client device 110, by selecting the dog image link, the user input utilizing the linked URL to access a digital service 115 (e.g., a recurring subscription service for Lucy Dog Treats) of the service provider system (block 706). In one or more implementations, the digital service 116 is configured to receive user inputs supporting conversion (e.g., purchase) of a good or service. By way of example, a user may be able to purchase some dog treats that were promoted via the social media post illustrated in FIG. 6.

Then, access to the digital service 116 is received by the client device 110 (block 708). By way of example, the client device 110 might receive access to a recurring subscription of Lucy Dog Treats. This receiving of access may be determined in various ways. For example, such a determination can be made by a service provider system 102, a content provider system 106, or the client device 110. The client device 110, or a computing device communicatively coupled to the client device 110, may communicate to the service provider system 102 or the content provider system 106 that conversion or access was achieved.

Responsive to the determination, a second portion of the resource allocation is shared with the client device 110 by the resource manager system 130 of the service provider system 102. Alternatively, the second portion of the resource allocation may be shared by the content provider system 106. The resource allocation may be in various forms, such as fiat currency, cryptocurrency, and so forth. Then, an indication of receipt of a second portion of the resource allocation shared with the client device 110 is received by the client device 110, responsive to the receiving of the access to the digital service 116 (block 710). For example, an email, text message, sound, vibration, pop up window, graphics or so on, may indicate receipt of an exclusive coupon shared with the client device 110.

Example System and Device

Figure 8:
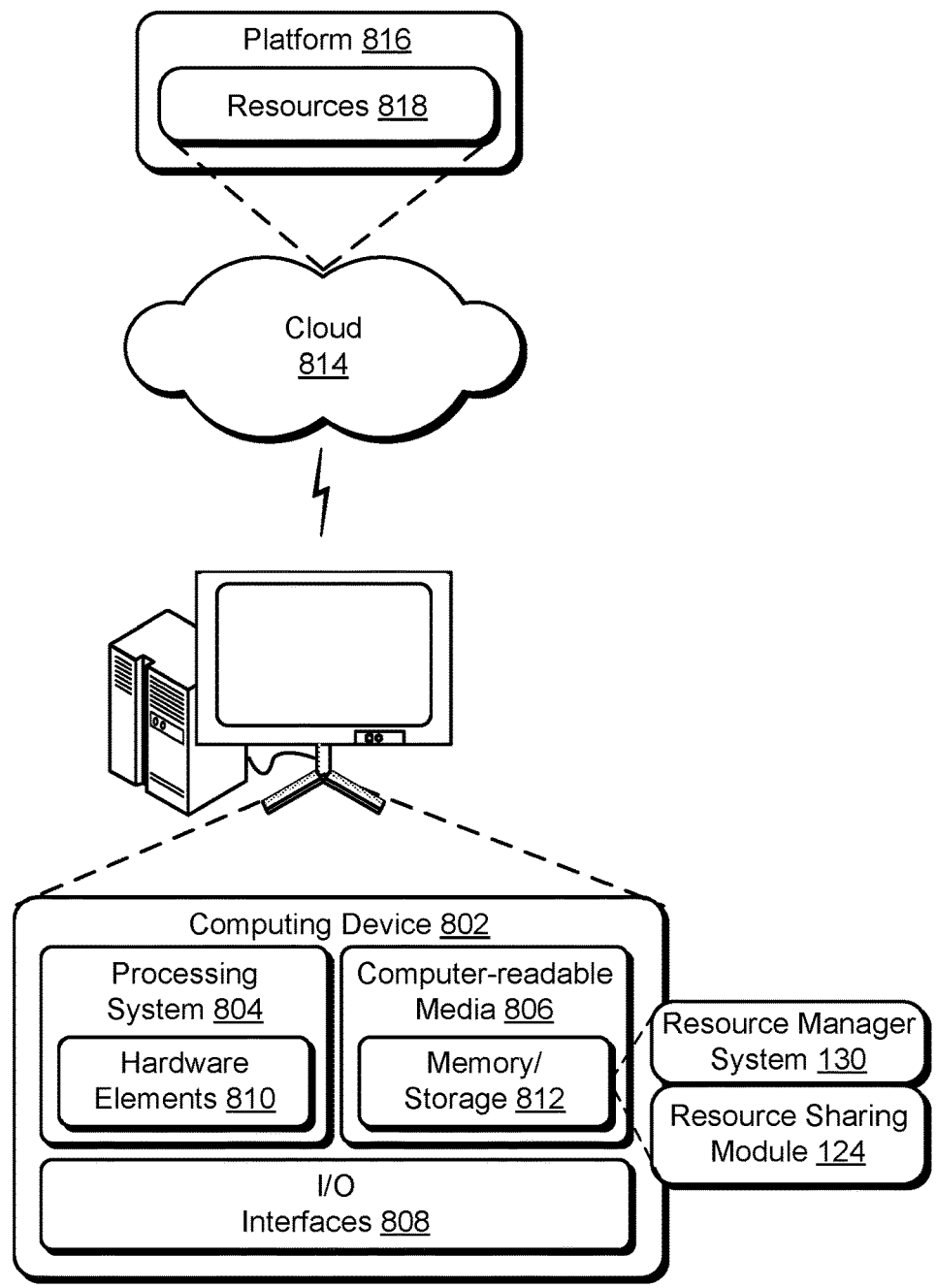
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the resource manager system 130 and the resource sharing module 124. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including one or more hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:

generating, by a service provider system implemented by the computing device, service access data that is usable to access a digital service via a network, the generating performed responsive to a user input received via a first control;

generating, by the service provider system implemented by the computing device, resource allocation data responsive to a user input received via a second control to specify a resource allocation associated with the digital service associated with the service access data generated via the first control;

transmitting, by the service provider system implemented by the computing device, the resource allocation data and the service access data to a content provider system;

receiving, by the service provider system implemented by the computing device, resource sharing data from the content provider system, the resource sharing data indicating:

a first portion of the resource allocation to be shared with a content creator of digital content of the content provider system, the digital content including the service access data configured to access the digital service; and a second portion of the resource allocation to be shared with a client device that utilizes the service access data to access the service provider system, the service access data including a code configured to be stored as a cookie at the client device, the code identifying the content creator of the digital content;

determining, by the service provider system implemented by the computing device, access of the digital service of the service provider system by the client device via the service access data;

identifying, by the service provider system implemented by the computing device, the content creator of the digital content via the code stored as the cookie at the client device; and based on the determining and the identifying, allocating, by the service provider system implemented by the computing device, the resource allocation to the content provider system and the client device based on the resource sharing data responsive to access to the digital service using the service access data.

2. The method as described in claim 1, further comprising displaying, by the service provider system implemented by the computing device, a user interface including:

the first control that is user selectable to specify access to the digital service; and the second control that is user selectable to indicate the resource allocation.

3. The method as described in claim 1, wherein the service access data includes a link to a network address, via which, the digital service is made available.

4. The method as described in claim 2, wherein the service access data includes digital marketing content that is selectable to cause the client device to access a network address.

5. The method as described in claim 1, wherein the digital service is configured to receive user inputs supporting conversion of a good or service.

6. The method as described in claim 1, wherein the code is configured to cause the first portion of the resource allocation to be shared with the content creator and the second portion of the resource allocation with the client device as part of the allocating.

7. The method as described in claim 1, wherein the second portion of the resource allocation to be shared with the client device is a coupon.

8. A system comprising:

a digital content control module implemented at least partially in hardware of a computing device to generate service access data that is usable to access a digital service via a network, the generating performed responsive to a user input received via a first control;

a resource allocation module implemented at least partially in the hardware of the computing device to generate resource allocation data responsive to a user input received via a second control to specify a resource allocation associated with the digital service associated with the service access data generated via the first control; and a resource management module implemented at least partially in the hardware of the computing device to:

transmit the resource allocation data and the service access data to a content provider system;

receive resource sharing data from the content provider system, the resource sharing data indicating:

a first portion of the resource allocation to be shared with a content creator of digital content of the content provider system, the digital content including the service access data configured to access the digital service; and a second portion of the resource allocation to be shared with a client device that utilizes the service access data to access the service provider system, the service access data including a code configured to be stored as a cookie at the client device, the code identifying the content creator of the digital content;

determine access of the digital service of the service provider system by the client device via the service access data;

identify the content creator of the digital content via the code stored as the cookie at the client device; and based on the determining and the identifying, allocate the resource allocation to the content provider system and the client device based on the resource sharing data responsive to access to the digital service using the service access data.

9. The system as described in claim 8, wherein the digital content control module is further implemented at least partially in the hardware of the computing device to display a user interface including:

the first control that is user selectable to specify access to the digital service; and the second control that is user selectable to indicate the resource allocation.

10. The system as described in claim 8, wherein the service access data includes a link to a network address, via which, the digital service is made available.

11. The system as described in claim 9, wherein the service access data includes digital marketing content that is selectable to cause the client device to access a network address.

12. The system as described in claim 8, wherein the digital service is configured to receive user inputs supporting conversion of a good or service.

13. The system as described in claim 8, wherein the code is configured to cause the first portion of the resource allocation to be shared with the content creator and the second portion of the resource allocation with the client device as part of the allocating.

14. The system as described in claim 8, wherein the second portion of the resource allocation to be shared with the client device is a coupon.

15. A non-transitory computer-readable storage medium comprising instructions stored that, responsive to execution by one or more processors, performs operations comprising:

generating service access data that is usable to access a digital service of a service provider system via a network, the generating performed responsive to a user input received via a first control;

generating resource allocation data responsive to a user input received via a second control to specify a resource allocation associated with the digital service associated with the service access data generated via the first control;

transmitting the resource allocation data and the service access data to a content provider system;

receiving resource sharing data from the content provider system, the resource sharing data indicating:

a first portion of the resource allocation to be shared with a content creator of digital content of the content provider system, the digital content including the service access data configured to access the digital service; and a second portion of the resource allocation to be shared with a client device that utilizes the service access data to access the service provider system, the service access data including a code configured to be stored as a cookie at the client device, the code identifying the content creator of the digital content;

determining access of the digital service of the service provider system by the client device via the service access data;

identifying the content creator of the digital content via the code stored as the cookie at the client device; and based on the determining and the identifying, allocating the resource allocation to the content provider system and the client device based on the resource sharing data responsive to access to the digital service using the service access data.

16. The non-transitory computer-readable storage medium as described in claim 15, further comprising displaying a user interface including:

the first control that is user selectable to specify access to the digital service; and the second control that is user selectable to indicate the resource allocation.

17. The non-transitory computer-readable storage medium as described in claim 15, wherein the service access data includes a link to a network address, via which, the digital service is made available.

18. The non-transitory computer-readable storage medium as described in claim 16, wherein the service access data includes digital marketing content that is selectable to cause the client device to access a network address.

19. The non-transitory computer-readable storage medium as described in claim 15, wherein the digital service is configured to receive user inputs supporting conversion of a good or service.

20. The non-transitory computer-readable storage medium as described in claim 15, wherein the code is configured to cause the first portion of the resource allocation to be shared with the content creator and the second portion of the resource allocation with the client device as part of the allocating.

\* \* \* \* \*